Aug. 23, 1960    L. C. THAYER ET AL    2,949,765
MEASURING CIRCUIT FOR FLUID ANALYZERS
Filed May 14, 1957

INVENTORS.
LOUIS C. THAYER
MALBONE W. GREENE
BY THEIR ATTORNEYS.
HARRIS, KIECH, FOSTER & HARRIS

United States Patent Office 2,949,765
Patented Aug. 23, 1960

2,949,765
MEASURING CIRCUIT FOR FLUID ANALYZERS

Louis C. Thayer, Duarte, and Malbone W. Greene, Pasadena, Calif., assignors, by mesne assignments, to Beckman Instruments, Inc., Fullerton, Calif., a corporation of California Filed May 14, 1957, Ser. No. 659,098

5 Claims. (Cl. 73—27)

This invention relates to a measuring circuit for use with fluid analyzers for improving the accuracy of the analyzer operation.

Fluid analyzers usually do not measure the desired characteristic of the fluid directly. Rather the analyzer measures one or more other characteristics of the fluid which can be related to the desired characteristic, which usually is the quantity of a particular component present in the fluid mixture. For example, in a magnetic wind-type gas analyzer, such as that shown in the patent to Medlock, No. 2,603,965, entitled Paramagnetic Gas Analyzer, the ultimate characteristic measured is a voltage difference resulting from a difference in resistance of two resistance heating windings which are connected in a bridge circuit, the resistance difference being caused by flow of the gas mixture past the windings, one of which is positioned in a magnetic field. The voltage difference is related to the oxygen content of the gas mixture, the rate of flow of the gas in a magnetic field being a function of the oxygen content thereof. However, the voltage difference will be a function of other characteristics of the gas mixture and of the measuring equipment, such as power supply voltage, ambient temperature, inlet and outlet pressures, and so forth. Therefore, in order to obtain an accurate measurement of oxygen content, it is necessary that all these other variables be maintained constant or that they be compensated.

Accordingly, it is an object of the invention to provide a circuit for use with a fluid analyzer which compensates for variables ordinarily affecting the output of the analyzer so that the output is a function only of the desired characteristic of the fluid being analyzed.

It is a further object of the invention to provide such a measuring circuit for use with an analyzer for combining the output of a sampling cell which is a function of a desired characteristic and of other characteristics with the output of a compensation cell which is a function only of such other characteristics to provide an analyzer output which is a function only of the desired characteristic. Another object of the invention is to provide such a measuring circuit wherein the other characteristics may be characteristics of the fluid being analyzed, the environment in which the measurement is taking place and/or the equipment used in conducting the measurement. A further object of the invention is to provide such a measuring circuit which may be used with various methods of analysis, a number of examples of which are given herein.

It is another object of the invention to provide an improved circuit providing for the combination of flow measurements with conductance or electrolysis measurements to give exact analysis results independent of varying flow rates.

Other objects of the invention and novel combinations and arrangements of parts will more fully appear in the course of the following description. The drawing merely shows and the description merely describes preferred embodiments of the present invention which are given by way of illustration or example.

The term "characteristic" as used herein refers to any characteristic of the fluid being analyzed, the analyzing equipment or the environment which will affect the output of the analyzer. Examples of such characteristics are composition, temperature, rate of flow, pressure, supply voltage, resistance, capacitance, inductance, mass, viscosity, density and specific heat.

Figure 1:
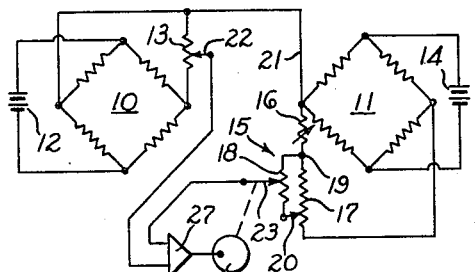
Fig. 1 is a schematic diagram showing a preferred embodiment of the invention.

The measuring circuit of Fig. 1 includes a sampling circuit 10 and a compensation circuit 11. The sampling circuit 10 includes a four element bridge with a power source 12 coupled across one pair of opposing corners of the bridge and a load in the form of a potentiometer or voltage divider 13 coupled across the other pair of opposing corners, the output of the sampling circuit being developed across the voltage divider.

The compensation circuit 11 includes a four element bridge having a power source 14 coupled across one pair of opposing corners of the bridge and a load 15 coupled across the other pair of opposing corners with the output of the compensation circuit being developed across the load. The load 15 may be a single resistor, a potentiometer as shown in the sampling circuit 10 or a combination of resistances including a variable resistance 16 connected in series with a potentiometer 17 which has a second potentiometer 18 connected across an end 19 and an arm 20.

The sampling circuit 10 and the compensation circuit 11 are connected by a conductor 21 so that the output of the measuring circuit appears across an arm 22 of the potentiometer 13 and an arm 23 of the potentiometer 18. When desired, of course, the output of the measuring circuit may be between the ends of the loads 13, 15 not connected by the conductor 21.

The outputs appearing at the arms 22, 23 are coupled to a servo-null system including a difference amplifier 27 which drives a motor 28 for varying the output of one of the circuits, the compensation circuit in Fig. 1, by moving the arm 23 of the potentiometer 18 to bring the input to the difference amplifier 27 to a null. The variable resistor 16 in the load 15 permits operation with a suppressed zero. When the resistance of the potentiometer 18 is considerably greater than the resistance of the potentiometer 17, at least by a factor of ten, the magnitude of the voltage supplied to the potentiometer 18 can be adjusted by moving the arm 20 of the potentiometer 17 without appreciably influencing the zero adjustment accomplished by means of the variable resistor 16. The potentiometer 13 permits selection of any desired portion of the output of the sampling circuit 10 and, of course, the motor 28 could be used to drive the arm 22 of the potentiometer 13 rather than the arm 23 of the potentiometer 18 if desired. When the servo-null system of Fig. 1 is utilized, the position of the potentiometer arm driven by the motor is a function of the output of the measuring circuit, which corresponds to the output of the sampling circuit 10, compensated for undesired characteristics measured by the compensation circuit 11.

The sampling circuit 10 is operated with a sampling cell containing the fluid being analyzed so that the output of the circuit varies as a function of a particular characteristic of the fluid. If a magnetic wind-type cell, such as shown in the Medlock patent, were being used, two of the elements of the bridge could be the two resistance heating windings of the cell. The specific coupling between the sampling circuit and the sampling cell will be determined by the particular cell used and additional examples will be given below. Ordinarily, the output of the sampling circuit will also be a function of one or more other variables or characteristics of the fluid, the cell or the circuit, so that the output will be equal to a variable Q times some function of variables $x$, $y$, $z$, . . . wherein Q represents the particular characteristic of the fluid for which analysis is being made.

The compensation circuit is operated with a compensation cell containing a fluid so that the output of the circuit varies only as a function of the other variables or characteristics, the output being equal to a constant $k$ times the same function of $x, y, z, \ldots$.

The output voltages of the two circuits are combined in subtractive relation as the input to the servo-null system. Only a portion of one of the output voltages is used, the magnitude of this portion being varied by the servo-null system to bring the input to a null. Thus where a portion P of the output voltage of the compensation circuit is used, the motor 28 drives the arm 23 of the potentiometer 18 to a position where a fraction of the compensation circuit output, $Pf(x,y,z, \ldots)$, is equal to the output of the sampling circuit, $Qf(x,y,z, \ldots)$. Then Q is equal to P and the position of the arm 23 is an indication of the value of the desired variable Q independent of the other variables, $x, y, z, \ldots$.

As an example of the operation of the measuring circuit of Fig. 1, in measuring the amount of oxygen present in a fluid, it is learned that the output of a particular sampling cell and circuit varies as a function of the ambient temperature as well as the amount of oxygen present. Then a compensation cell and circuit identical to the sampling cell and circuit are provided with a reference fluid having a fixed composition so that the output of the compensation circuit is a function only of ambient temperature. The outputs of the sampling circuit and the compensation circuit are combined as described above and the position of the arm of the potentiometer driven by the servo motor is then a function only of the amount of oxygen present.

As another example, the output of a sampling cell and circuit may be a function of the amount of oxygen present and of the rate of flow of the fluid to the sampling cell. A flowmeter cell is used as the compensation cell to provide an output which is a function only of rate of flow of the fluid with the sample fluid being passed through the flowmeter and through the sampling cell. Here again, the combining of the outputs of the sampling and compensation circuits provides a measuring circuit output which is a function only of the amount of oxygen present in the fluid.

Figure 2:
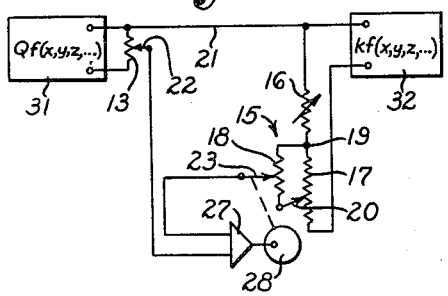
Fig. 2 is a schematic diagram showing a more general form of the embodiment of Fig. 1.

A more general form of the measuring circuit of Fig. 1 is shown in Fig. 2. A sampling unit 31, which may be any measuring apparatus producing an electrical output, $Qf(x,y,z, \ldots)$, and a compensation unit 32, which may be any measuring apparatus producing an electrical output $kf(x,y,z, \ldots)$, are coupled to loads 13, 15, respectively and coupled together by the conductor 21. The outputs of the units are coupled to a servo-null system, such as the difference amplifier 27 and motor 28 of Fig. 1, which drives the voltage divider of one of the loads to bring the input to the amplifier to a null.

Figure 3:
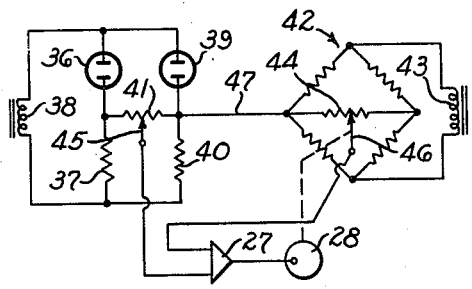
Fig. 3 is a schematic diagram showing a form of the invention which is applicable to electrolytic conductance analyzers.

Fig. 3 illustrates an improved measuring circuit for use with electrolytic conductance instruments. The amount of a particular component in a fluid mixture may be determined by measuring the electrical conductance of the mixture. Also, when the conductance of a particular component cannot be measured directly, the change in conductance of a second component before and after reaction with the first component can be related to the amount of the first component present. This method is particularly suitable in the measurement of gases which ionize on dissolving such as ammonia, because the concentration in the liquid phase is not simply related to the composition in the gas phase. In the measuring circuit of Fig. 3, the output of the sampling cell means, which is a function of the change in a conductance of a liquid before and after reaction with a gas, is combined with the output of a compensation cell, which is a function of the rate of flow of a gas to the liquid, resulting in a measuring circuit output which is a function of the composition of the gas.

For example, a solution of barium hydroxide is passed through a gas contact tower at a constant rate and a sample gas containing carbon dioxide is passed into the tower at a varying rate. The carbon dioxide will react with the barium hydroxide, reducing the concentration of barium hydroxide and producing a corresponding change in the conductance of the liquid. The composition of the input gas, i.e., the percentage of carbon dioxide present, is then determined by relating the total gas flow to the change in concentration of the barium hydroxide.

This measurement is easily made by the circuit of Fig. 3. A conductance measuring cell 36 is serially connected to a load resistor 37 across a power source 38 in parallel with a similar conductance measuring cell 39 and load resistor 40, the output of this sampling cell unit being the difference in conductances measured by the two cells and appearing across an output resistor 41 coupled to the junction of the respective cells and load resistors. The sensing elements of a gas flowmeter are coupled in a bridge circuit 42 having a power source 43 connected across one pair of opposing terminals and an output resistor 44 connected across the other pair of opposing terminals. The output resistors 41, 44, each of which is preferably a potentiometer having a moving arm 45, 46, respectively, are connected by a conductor 47. The outputs appearing at the arms 45, 46 are connected to a servo-null system, as in the circuits of Figs. 1 and 2, with the motor driving one of the arms to bring the input of the amplifier to a null and to give an indication of the output of the measuring circuit.

In operation with the circuit of Fig. 3, the liquid is passed through one of the conductance cells, then through the gas contacting tower and through the second conductance cell while the gas is passed through the flowmeter and then to the contacting tower. It is preferred that the electrical output of the flowmeter be a linear funcion of mass flow of the gas so that the calibration of the instrument will be constant. The load 15 of Figs. 1 and 2 may be substituted for the load 44 of Fig. 3, if the various adjustments permitted by the load 15 are desired.

This method of analysis may be applied to any gas which forms ions in solution, such as hydrogen cyanide, hydrogen sulfide, sulphur dioxide, hydrogen selenide, nitrogen oxychloride or chlorine, as well as with other gases which can be made to react in solutions, such as hydrogen with silver orthophosphate, nitric oxide with oxygen or acetylene with silver salts. Various reagents may be selected for use with the particular gas being analyzed.

Figure 4:
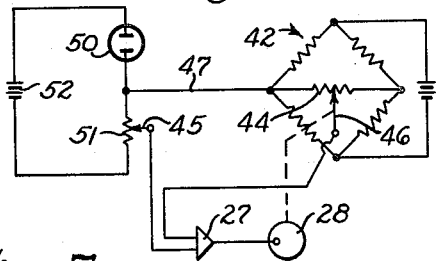
Fig. 4 is a schematic diagram showing another form of the invention which is applicable to moisture analyzers.

Fig. 4 illustrates a form of the measuring circuit of the invention suitable for use with an electrolysis type measuring apparatus. This circuit will be described in conjunction with apparatus for determining the moisture content of a sample gas, however, it may be used with other applications, some of which will be referred to below. An electrolysis cell 50 is coupled in series with a load resistor 51 across a power source 52 to serve as a sampling circuit. The current through the circuit and hence the voltage across the resistor 51 will be a function of the amount of water introduced into the cell and electrolyzed therein. The output voltage of the sampling circuit, being a function of the total amount of moisture introduced into the cell, must be corrected for the rate of flow of sample fluid to the cell to provide an indication of the moisture content of the sample. Therefore, the sample is also passed through a flowmeter, the sensitive elements of which are coupled into the bridge circuit 42 as in the circuit of Fig. 3, which serves as the compensation circuit. Then the outputs of the sampling and compensation circuits are combined as indicated previously to provide a measuring circuit output which is a function of the moisture content of the sample.

The measuring circuit of Fig. 4 may be applied to any apparatus in which a substance is quantitatively reacted at electrodes, such as the oxidation of hydrazine at a noble metal electrode in the presence of a caustic electrolyte or the plating out of copper from a solution to determine the amount of copper in solution. In the latter example, the sampling circuit will produce an output which is a function of the current used in plating out the copper and the compensation circuit will produce an output which is a function of the rate of flow of the copper-containing-solution to the plating electrodes.

Figure 5:
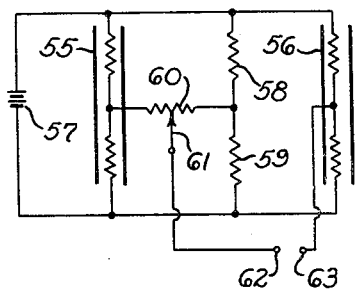
Fig. 5 is a schematic diagram showing a form of invention which is applicable to thermal convection analyzers.
Figure 6:
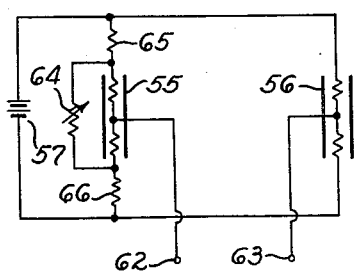
Fig. 6 is a schematic diagram showing an alternative form of the embodiment of Fig. 5.

Another form of the measuring circuit of the invention for compensation of thermal convection instruments for changes in barometric pressure and in power supply is illustrated in Figs. 5 and 6. This form of the invention will be described in conjunction with apparatus for the determination of the percentage of carbon dioxide in a stream of hydrogen. In Fig. 5, the resistance heating windings of thermal convection cells 55, 56, which may be of the type shown in the copending application of Greene and Thayer, entitled Method and Apparatus for Fluid Analysis, Serial No. 480,148, filed January 6, 1955, are coupled in parallel across a power source 57. Resistors 58, 59 are connected in series across the source 57 and a potentiometer 60 is coupled between the junction of the resistors 58, 59 and the junction between the windings of the cell 55. These resistors are preferably of the stable, temperature insensitive type since the accuracy of the instrument is improved thereby. An arm 61 of the potentiometer 60 is connected to one of the terminals 62 and another output terminal 63 is connected to the junction of the windings in the cell 56, the output of the measuring circuit appearing across the terminals 62, 63. This output may be measured directly on a volt meter or other indicating instrument or a servo-null system may be utilized as described above.

In the operation of the analyzer, the stream of hydrogen gas is passed through the cell 56, which corresponds to the sampling unit of Fig. 2, and is then vented to the atmosphere. Since this cell is vented to the atmosphere, changes in barometric pressure affect the pressure within the cell and hence the output thereof. A reference stream of air is passed through the cell 55 and vented to the atmosphere. For small amounts of carbon dioxide in the stream of hydrogen passing through the cell 56, the output from the cell 55, which corresponds to the compensation unit of Fig. 2, will be somewhat greater than that from the cell 56. Therefore, the output from the cell 55 is reduced by means of the potentiometer 60 whihc acts as a voltage divider. The instrument is calibrated with air in the cell 55 and pure hydrogen in the cell 56, at which time the arm 61 of the potentiometer is adjusted to provide a zero or a known output at the terminals 62, 63. Then since the output from the cell 55 will vary as a function of barometric pressure and as a function of supply voltage in the same manner as the output of the cell 56, the output of the latter will be compensated for these undesired variables so that the measuring circuit output is solely a function of the carbon dioxide content of the hydrogen stream.

In applications where the output of the cell with the sample gas therein is greater than the output of the cell with the reference gas, i.e., air, the sample gas will be passed through the cell 55 and the reference gas will be passed through the cell 56, since the operation of the voltage divider potentiometer 60 serves to reduce the magnitude of the output from the cell 55.

An alternative embodiment of the measuring circuit of Fig. 5 is shown in Fig. 6, wherein the resistors 58, 59 and 60 of Fig. 5 are omitted and a variable resistor 64 is coupled across the windings of the cell 55 and equal value resistors 65, 66 are coupled in series at each end of the cell windings so that the impedance of the circuit associated with the cell 55 will be equal to the impedance of the circuit of the cell 56. The apparatus of Fig. 6 is operated in the same manner as the apparatus of Fig. 5, with the magnitude of the output from the cell 55 being controlled by varying the value of the resistor 64.

Figure 7:
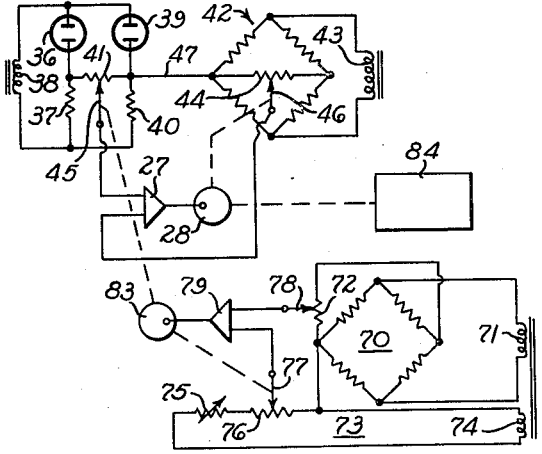
Fig. 7 is a schematic diagram of an embodiment of the invention which provides compensation for characteristics which vary directly and which vary inversely with the desired characteristic.

Fig. 7 is an illustration of how the measuring circuit of the invention may be used to compensate a sampling unit for two variables or sets of variables which are different functions of the output of the sampling unit. Suppose the output of the sampling unit is equal to $Qf(x,y,z, \ldots)/f(u,v,w, \ldots)$. The compensation unit of Fig. 1, having an output equal to $kf(x,y,z, \ldots)$, will be used, as will a second compensation unit having an output equal to $k'f(u,v,w, \ldots)$. A measurement of Q will be obtained, independent of the other variables $x, y, z, \ldots, u, v, w, \ldots$.

The analyzer used with the measuring circuit of Fig. 7 is similar to that of Fig. 3 with the exception that the rate of flow of the liquid reagent also varies. Hence, the output of the sampling unit will vary inversely as the liquid flow rate and requires compensation therefor. A bridge circuit 70 of a liquid flowmeter has a power source 71 connected across one pair of opposing terminals and a voltage dividing potentiometer 72 connected across the other pair of opposing terminals. The output of this second compensation unit is used to vary the fraction of the output of the sampling unit which is compared to the output of the first compensation circuit. The variation is controlled by means of a servo-null system which drives the arm 45 of the potentiometer 41 in the sampling circuit.

A reference voltage circuit 73 including a power source 74, a variable resistance 75 and a potentiometer 76 provides a reference voltage at an arm 77 of the potentiometer 76 which with the output of the second compensation unit appearing at an arm 78 of the potentiometer 72 drive a difference amplifier 79. A motor 83 actuated by the output of the difference amplifier 79 drives the arm 77 to bring the input to the difference amplifier to a null and at the same time drives the arm 45 to vary the output of the sample unit as a function of the output of the second compensation unit. The operation of the remainder of the measuring circuit is as described in conjunction with Fig. 3, the unit 84 being an indicator or recorder driven by the motor 28.

The input to the amplifier 27 from the potentiometer arm 45 will be $$k'f(u,v,w, \ldots) \times \frac{Qf(x,y,z, \ldots)}{f(u,v,w, \ldots)}$$

the term corresponding to that portion of the output of the second compensation unit represented by the position of the arm 45 and the second term corresponding to the output of the sampling unit. Thus, when the output of the amplifier 27 is nulled, the signal at the arm 45 will be equal to a fraction of the output of the first compensation circuit, $Pkf(x,y,z,\ldots)$, and the position of the arm 46 is an indication of the value of the desired variable Q, independent of the other variables.

In the analyzer of Fig. 7, the liquid reagent passes through the liquid flowmeter, the first conductance cell, the gas contacting tower and the second conductance cell while sample gas passes through the gas flowmeter to the gas contacting tower, both streams moving at a variable rate. The output as indicated at 84 will then be a function of the particular characteristic of the sample which in this case is the percentage of carbon dioxide in the sample gas.

In many applications of the analyzer, where the liquid flow rate is relatively stable, only one amplifier and motor need be used. The amplifier and motor would be used to drive the recording mechanism and the first compensation unit ordinarily and would be intermittently switched to drive the sampling unit and the reference voltage unit. In one such application, the servo-null system is switched to the second compensation unit for about ten seconds every five minutes.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. A measuring circuit for a gas analyzer wherein a particular component of a gas mixture is reacted with a liquid to create a change in conductance of the liquid, said analyzer having a reaction chamber, a pair of conductance cells for measuring the conductance of the liquid before and after said reaction, and a gas rate-of-flow meter, said measuring circuit including in combination: a first circuit for coupling to said conductance cells, said first circuit producing an electrical output which is a function of the difference in conductances measured by the two cells; a second circuit for coupling to said rate-of-flow meter, said second circuit producing an electrical output which is a function of the rate of flow of the gas mixture to the reaction chamber; and means for combining one of said outputs with a portion of the other of said outputs in subtractive relationship producing an analyzer output which is a function of the quantity of the particular component present in the gas mixture.

2. A measuring circuit for a gas analyzer wherein a particular component of a gas mixture is reacted with a liquid to create a change in conductance of the liquid, said analyzer having a reaction chamber, a pair of conductance cells for measuring the conductance of the liquid before and after said reaction and a gas rate-of-flow meter, said measuring circuit including in combination: a first circuit for coupling to said conductance cells, said first circuit producing an electrical output which is a function of the difference in conductances measured by the two cells; a second circuit for coupling to said rate-of-flow meter, said second circuit producing an electrical output which is a function of the rate of flow of the gas mixture to the reaction chamber, at least one of said outputs being developed across a voltage divider; a difference amplifier, said difference amplifier being driven from said outputs through said voltage dividers; motor means; means for coupling the output of said difference amplifier to said motor means in driving relationship; and means coupling said motor means to one of said voltage dividers to bring said output of said difference amplifiers to a null.

3. In a circuit for use with sampling cell means and two compensation cell means to measure a particular characteristic of a fluid, the combination of: a sampling circuit coupled with said sampling cell means for producing an electrical output which is a function of said particular characteristic and of at least two other characteristics associated with said output of said sampling circuit; a first compensation circuit coupled with one of said compensation cell means for producing an electrical output which is a function only of certain of such other characteristics associated with said output of said sampling circuit; a second compensation circuit coupled to the other of said compensation cell means for producing an electrical output which is a function only of the remainder of such other characteristics associated with said output of said sampling circuit; means for varying the magnitude of the output of one of said cell circuits as a function of the output of a second of said cell circuits; electrical summing means for combining the outputs of said one and the third of said cell circuits in subtractive relationship; and means for coupling the output of said one and third cell circuits to said summing means, said summing means output providing an indication which is a function only of said particular characteristic.

4. A measuring circuit for a gas analyzer wherein a particular component of a gas mixture is reacted with a liquid to create a change in conductance of the liquid, said analyzer having a reaction chamber, a pair of conductance cells for measuring the conductance of the liquid before and after said reaction, a gas flowmeter, a liquid flowmeter, means for conducting the gas through the gas flowmeter and the reaction chamber and means for conducting the liquid through the liquid flowmeter, the reaction chamber and the conductance cells, said measuring circuit including in combination: a sampling circuit for coupling to said conductance cells, said sampling circuit producing an electrical output which is a function of the difference in conductances measured by the two cells, said outputs being developed across a first voltage divider; a gas flow circuit for coupling to said gas flowmeter, said gas flow circuit producing an electrical output which is a function of the rate of flow of the gas mixture to the reaction chamber, said output being developed across a second voltage divider; a liquid flow circuit for coupling to said liquid flowmeter, said liquid flow circuit producing an electrical output which is a function of the rate of the flow of the liquid to the reaction chamber; means for actuating one of said voltage dividers to vary the output thereof as a function of said output of said liquid flow circuit; a difference amplifier, said difference amplifier being driven from the outputs of said voltage dividers; motor means; means for coupling the output of said difference amplifier to said motor means in driving relationship; and means for coupling said motor means to one of said voltage dividers for actuating such voltage divider to bring said output of said difference amplifier to a null.

5. A measuring circuit for a gas analyzer wherein a particular component of a gas mixture is reacted with a liquid to create a change in conductance of the liquid, said analyzer having a reaction chamber, a pair of conductance cells for measuring the conductance of the liquid before and after said reaction, and a gas rate-of-flow meter, said measuring circuit including in combination: a first circuit for coupling to said conductance cells, said first circuit producing a first electrical output which is a function of the difference in conductances measured by the two cells; a second circuit for coupling to said rate-of-flow meter, said second circuit producing a second electrical output across a voltage divider, which second output is a function of the rate of flow of the gas mixture to the reaction chamber, said voltage divider including a variable resistance and a first potentiometer connected in series across said second output and a second potentiometer coupled between a moving arm and an end of said first potentiometer, the resistance of said second potentiometer being greater than the resistance of said first potentiometer by at least a factor of ten; and means for combining said first output with the output at the arm of said second potentiometer, in subtractive relationship producing an analyzer output which is a function of the quantity of the particular component present in the gas mixture.

References Cited in the file of this patent

UNITED STATES PATENTS

| | | |
|---|---|---|
| 2,501,377 | Cherry | Mar. 21, 1950 |
| 2,603,965 | Medlock | July 22, 1952 |
| 2,652,727 | Richardson et al. | Sept. 22, 1953 |
| 2,763,151 | Richardson | Sept. 18, 1956 |